United States Patent
Fletcher et al.

(10) Patent No.: US 10,732,372 B2
(45) Date of Patent: Aug. 4, 2020

(54) SHELF FOR COMMUNICATIONS RACK OR CABINET

(71) Applicant: CommScope, Inc. of North Carolina, Hickory, NC (US)

(72) Inventors: Neil Christopher Fletcher, Southampton (GB); Wade J. Womack, Allen, TX (US)

(73) Assignee: COMMSCOPE, INC. OF NORTH CAROLINA, Hickory, NC (US)

( * ) Notice: Subject to any disclaimer, the term of this patent is extended or adjusted under 35 U.S.C. 154(b) by 0 days.

(21) Appl. No.: 14/853,024

(22) Filed: Sep. 14, 2015

(65) Prior Publication Data

US 2016/0313525 A1 Oct. 27, 2016

Related U.S. Application Data

(60) Provisional application No. 62/198,322, filed on Jul. 29, 2015, provisional application No. 62/163,758, filed on May 19, 2015, provisional application No. 62/155,609, filed on May 1, 2015, provisional application No. 62/152,435, filed on Apr. 24, 2015.

(51) Int. Cl.
  *G02B 6/44* (2006.01)
(52) U.S. Cl.
  CPC ......... *G02B 6/4453* (2013.01); *G02B 6/4478* (2013.01)
(58) Field of Classification Search
  CPC ................ G02B 6/4453; G02B 6/4478
  See application file for complete search history.

(56) References Cited

U.S. PATENT DOCUMENTS

| | | | | |
|---|---|---|---|---|
| 5,011,257 A | * | 4/1991 | Wettengel | G02B 6/3897 385/53 |
| 5,046,811 A | * | 9/1991 | Jung | G02B 6/4441 385/135 |
| 5,903,698 A | | 5/1999 | Poremba et al. | |
| 7,496,269 B1 | * | 2/2009 | Lee | G02B 6/4452 385/134 |
| 8,600,208 B2 | * | 12/2013 | Badar | G02B 6/4453 385/135 |
| 2002/0181924 A1 | | 12/2002 | Schray | |
| 2003/0129871 A1 | | 7/2003 | Follingstad | |
| 2008/0002937 A1 | | 1/2008 | Spisany et al. | |
| 2009/0067800 A1 | * | 3/2009 | Vazquez | G02B 6/4455 385/135 |
| 2009/0214171 A1 | * | 8/2009 | Coburn | G02B 6/3897 385/135 |

(Continued)

FOREIGN PATENT DOCUMENTS

CN    104378160 A    2/2015

OTHER PUBLICATIONS

Extended European Search Report for Application No. 16783828.3 dated Oct. 30, 2018.

*Primary Examiner* — Chris H Chu
(74) *Attorney, Agent, or Firm* — Merchant & Gould P.C.

(57) ABSTRACT

A fiber optic shelf includes: a floor; side walls attached to opposite side edges of the floor, wherein the shelf has a longitudinal axis defined between the side walls; and a rear wall attached to a rear edge of the floor. The rear wall has a stepped profile and comprises a plurality of mounting panels facing laterally at an oblique angle to the longitudinal axis of the shelf.

15 Claims, 7 Drawing Sheets

(56) References Cited

U.S. PATENT DOCUMENTS

| | | | |
|---|---|---|---|
| 2009/0245746 A1* | 10/2009 | Krampotich | G02B 6/4452 385/135 |
| 2010/0158465 A1* | 6/2010 | Smrha | G02B 6/4453 385/135 |
| 2012/0051708 A1* | 3/2012 | Badar | G02B 6/4453 385/135 |
| 2014/0003784 A1* | 1/2014 | Claeys | H04Q 1/021 385/135 |

* cited by examiner

SHELF FOR COMMUNICATIONS RACK OR CABINET

RELATED APPLICATIONS

The present application claims priority from and the benefit of U.S. Provisional Patent Application Nos. 62/152,435, filed Apr. 24, 2015; 62/155,609, filed May 1, 2015; 62/163,758, filed May 19, 2015; and 62/198,322, filed Jul. 29, 2015, the disclosure of each of which is hereby incorporated herein in its entirety.

FIELD OF THE INVENTION

The present invention relates generally to communications systems, and more specifically to racks and cabinets for communications systems.

BACKGROUND

Communications cables, such as shielded and unshielded twisted pair cables, coaxial cables, and fiber optic cables, transmit data, voice, video and/or audio information in the telecommunications industry. Network equipment enclosure rack systems are well-known in this industry for managing and organizing such cables as they are routed to and from various destinations.

Rack systems typically include a distribution frame rack or cabinet on which one or more patch panels, network equipment, fiber optic enclosures such as fiber optic trays, and the like are mounted. Rack systems serve various functions, including their use as slack trays, splice trays, cable organizers and patch panels. These rack systems also serve as interconnect or cross-connect enclosures when they interface with equipment. Additionally, rack systems may serve as a telecommunications closet, allowing the cables to be terminated, spliced, patched and/or stored at various places along their length.

The rack is usually formed from a frame having mounting apertures located along the vertical legs or walls of the rack. Patching equipment, such as a patch panel, is mounted onto the rack so as to generally define a patching side, where patch cords from another active device or another patch panel can be cross-connected and interconnected, and a distribution side, where cables from network equipment and/or work station areas are terminated.

Generally, some structures or features for cable management for rack-mounted fiber optic trays are provided on both sides of the rack to support and route the cables. With the increasing use of fiber optic connectors as applied to connector rack systems, proper cable management and bend radius control has become increasingly important.

User requirements for optical fiber patch cord management vary greatly. Some users may prefer a full width trough for maximum protection of the patch cords, and some may prefer a minimal trough or J-hook for easier access to the cords and connectors/adapters. Typically these patch cord management structures are integral with the tray. In some instances, a user may install a tray into a server cabinet, then learn that equipment rail placement is not adequate to allow use of a trough, in which case the tray is removed altogether.

Also, typically communications cables entering a shelf or enclosure enter in a direction normal to the side or rear of the shelf (often through a gland or similar structure for securing the cable). Cables entering the shelf may be rather stiff, and in the case of fiber optic cables may have a minimum acceptable bend radius that reduces the degree to which the cables are permitted to flex. As such, a path of entry that is normal to the side or rear can create large cable loops which are difficult to manage and/or which may require undue amounts of space adjacent the shelf.

SUMMARY

As a first aspect, embodiments of the invention are directed to a fiber optic shelf, comprising: a floor; side walls attached to opposite side edges of the floor, wherein the shelf has a longitudinal axis defined between the side walls; and a rear wall attached to a rear edge of the floor. The rear wall has a stepped profile and comprises a plurality of mounting panels facing laterally at an oblique angle to the longitudinal axis of the shelf.

As a second aspect, embodiments of the invention are directed to a fiber optic shelf, comprising: a floor; side walls attached to opposite side edges of the floor; and a rear wall assembly attached to a rear edge of the floor. The rear wall assembly comprises a frame and a plurality of mounting units, each of the mounting units being pivotally attached to the frame about an axis substantially normal to the floor.

As a third aspect, embodiments of the invention are directed to a fiber optic tray assembly, comprising: a fiber optic tray having side rails, a floor and a front bulkhead, the front bulkhead including a window that leads to a channel, the channel including a first interlocking feature; and a cable management structure having at least one cable management finger mounted to a forward portion thereof and a tongue extending rearwardly, the tongue including a second interlocking feature. The tongue is inserted into the channel through the window such that the second interlocking feature engages the first interlocking feature.

As a fourth aspect, embodiments of the invention are directed to a dual fiber optic tray assembly, comprising: first and second fiber optic trays, each having side rails, a floor and a front bulkhead, the front bulkhead including a window that leads to a channel, wherein the channel includes a first interlocking feature; and a cable management structure having a plurality of cable management fingers mounted to a forward portion thereof and first and second tongues extending rearwardly, the tongues each including a second interlocking feature. The first and second tongues are inserted into the channels of the first and second fiber optic trays through the windows such that the second interlocking feature of each of the first and second tongues engages the first interlocking feature of each channel of the first and second fiber optic trays.

As a fifth aspect, embodiments of the invention are directed to a method of fitting a cable management structure onto a fiber optic tray, comprising the steps of: (a) providing a fiber optic tray having side rails, a floor and a front bulkhead, the front bulkhead including a window that leads to a channel, wherein the channel includes a first interlocking feature; (b) providing a cable management structure having at least one cable management finger mounted to a forward portion thereof and a tongue extending rearwardly, the tongue including a second interlocking feature; and (c) inserting the tongue into the channel through the window such that the second interlocking feature engages the first interlocking feature.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
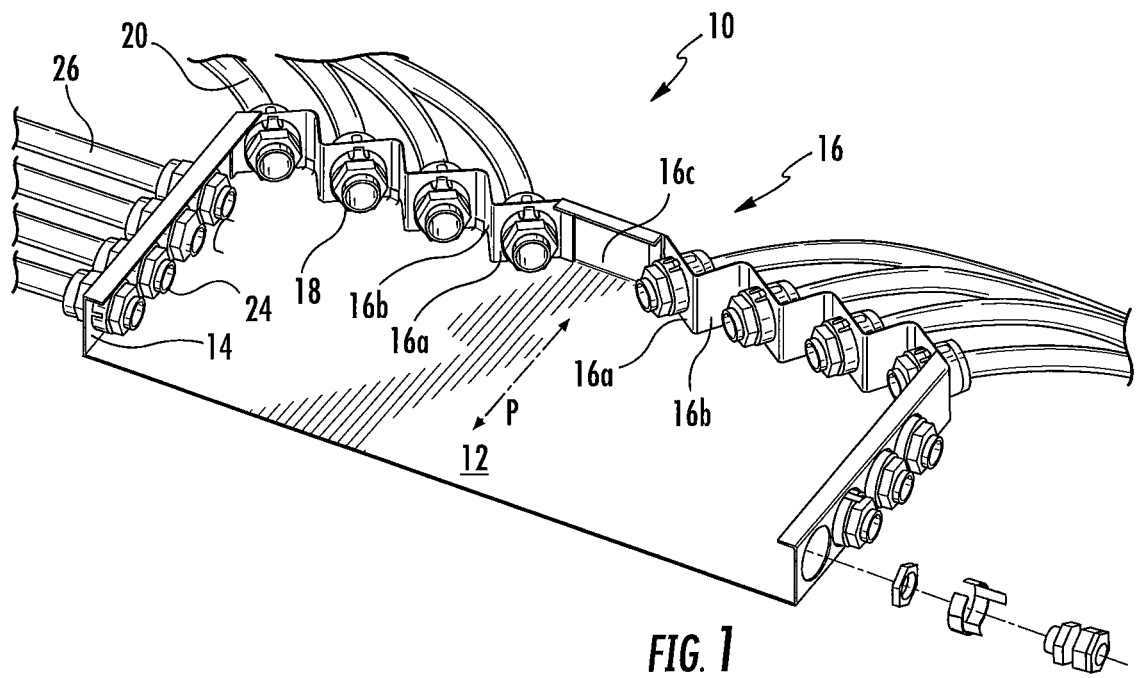
FIG. 1 is a front perspective view of a communications enclosure shelf according to embodiments of the present invention, with communications cables shown entering the shelf.

An alternative approach to routing of cables, and in particular fiber optic cables, that can save space is shown in FIG. 1, in which a shelf 10 is illustrated. As can be seen in FIG. 1, the shelf 10 is generally an open-ended rectangular box, with a floor 12, side walls 14, and a rear wall 16. As used herein to describe the relative positions of components, the terms "lateral", "outward" and derivatives thereof indicate the directions defined by a vector beginning at the vertical plane P that bisects the shelf 10 normal to the rear wall 16 and extending toward either side wall 14. Conversely, the terms "inward", "inboard" and derivatives thereof indicate the direction opposite the "outward" direction. Together, the "inward" and "outward" directions comprise the "transverse" axis of the shelf 10. The "rear" of the shelf 10 is located nearest the rear wall 16, and the "front" of the shelf 10 is located at the edge of the floor 12 away from the rear wall 16. The "front" and "rear" directions (which are parallel with the vertical planer) comprise the "longitudinal" axis of the shelf 10.

As can be seen in FIG. 1, the rear wall 16 has a stepped profile, with mounting panels 16a being canted at an oblique angle to the longitudinal axis of the shelf 10 and facing outwardly, and with transition panels 16b between the mounting panels 16a being canted to face inwardly. A center panel 16c is located in a central portion of the rear wall 16 and is generally perpendicular to the side walls 14. The mounting panels 16a are typically canted at an angle of about 30 and 60 degrees to the longitudinal axis of the shelf 10. As shown in FIG. 1, a first subset of mounting panels 16a is canted to face rearwardly and outwardly toward one side of the shelf 10, and a second subset of mounting panels 16a is canted to face rearwardly and outwardly toward the other side of the shelf 10.

A cable gland 18 is mounted in each of the mounting panels 16a. The cable glands 18 can be any cable glands known to those of skill in this art to be suitable for the mounting and sealing of cables entering a cable shelf Each of the cable glands 18 has a longitudinal axis that is normal to its respective mounting panel 16a.

Still referring to FIG. 1, fiber optic cables 20 are routed through and mounted in the cable glands 18. The fiber optic cables 20 are generally relatively thick cables and as such have relatively high minimum bending radius ratings. Each fiber optic cable 20 passes through its respective cable gland 18 coincident with the longitudinal axis of the cable gland 18, and therefore extends rearwardly from the rear wall 16 at an angle that is normal to the mounting panel 16a. As such, the cables 20 require less rearward space behind the shelf 10 to be routed laterally from their mounted locations.

In the illustrated embodiment, each of the side walls 14 includes a plurality of cable glands 24, through which additional cables 26 pass. These additional glands 24 and cables 26 are optional and need not be included in some embodiments.

Figure 2:
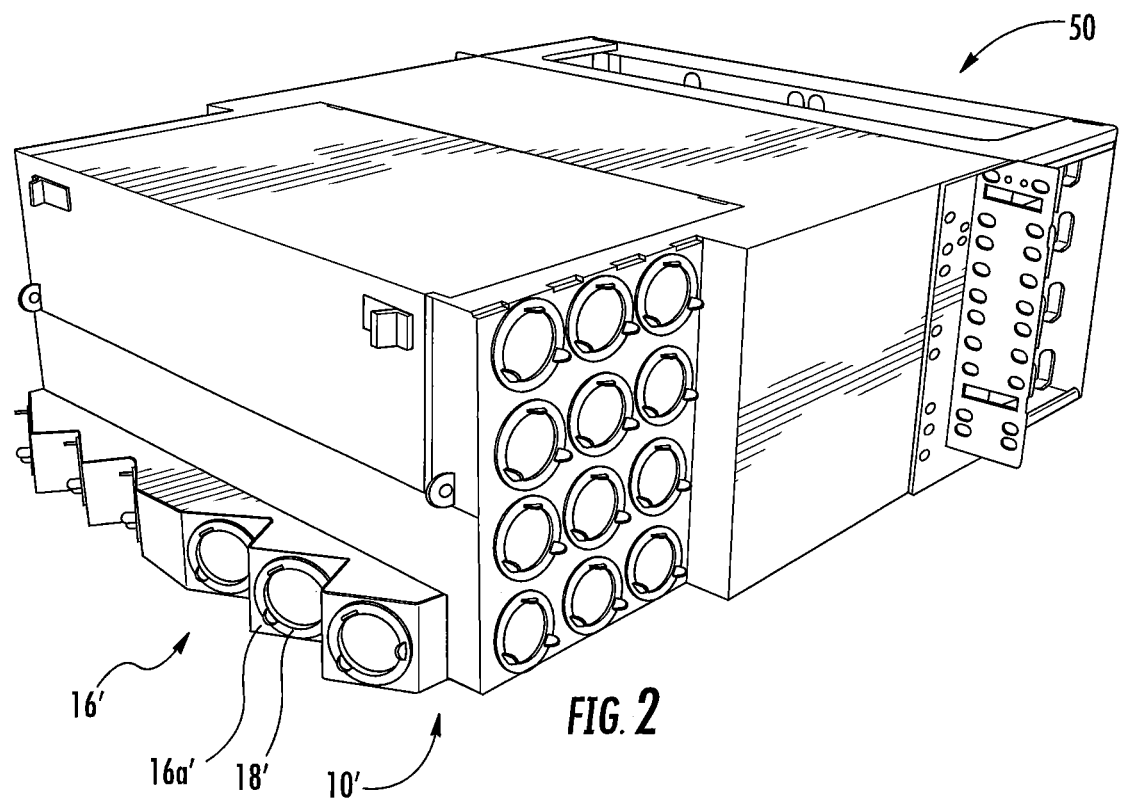
FIG. 2 is a rear perspective view of an alternative embodiment of the shelf of FIG. 1 mounted on a communications rack.
Figure 3:
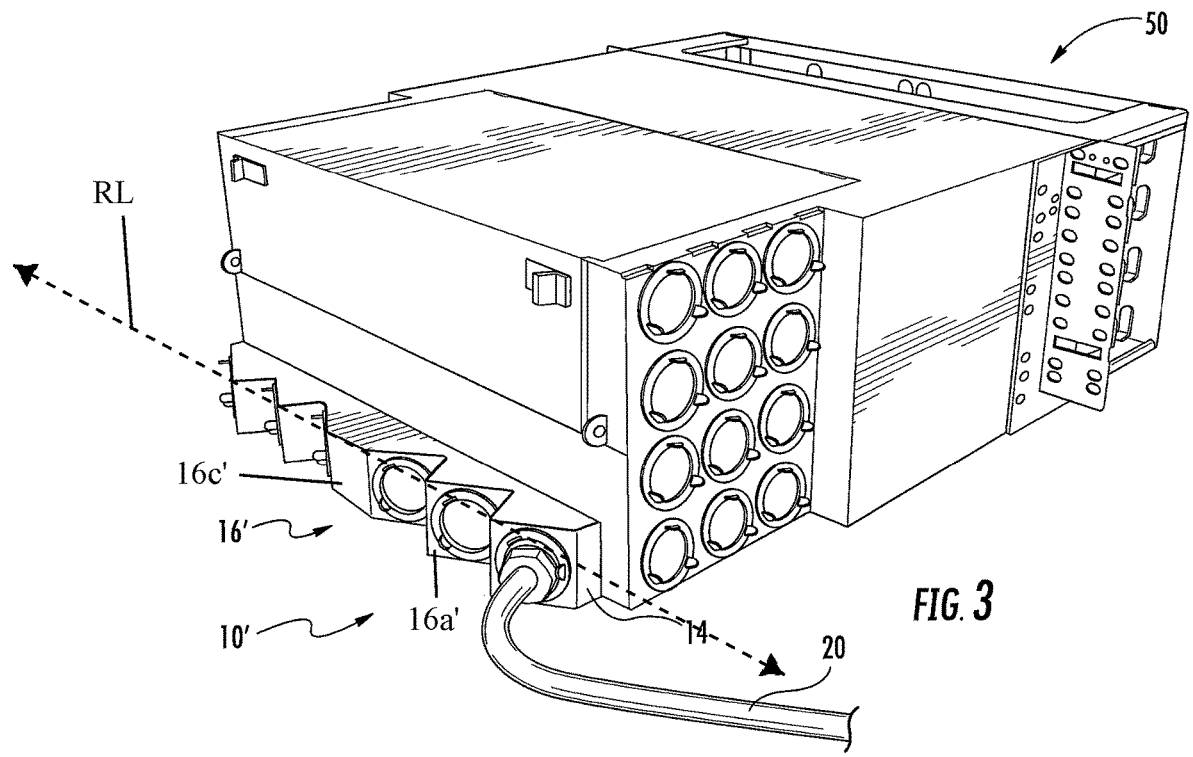
FIG. 3 is a rear perspective view of the mounted shelf of FIG. 2 with an exemplary communications cable entering the shelf at one of the mounting panels.
Figure 4:
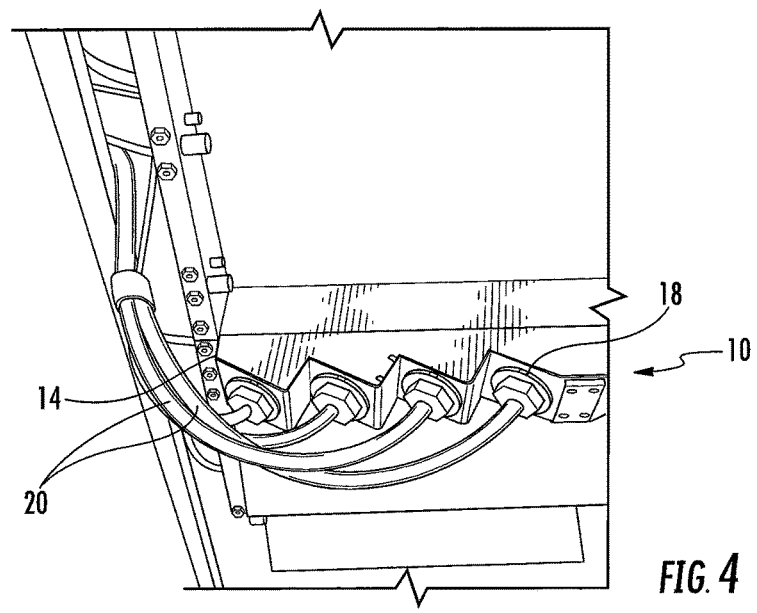
FIG. 4 is a partial top rear perspective view of the mounted shelf of FIG. 1 with a plurality of communications cables entering the shelf.

FIG. 2 illustrates a shelf 10' mounted in a communications rack 50 (in its rear wall 16', the shelf 10' has six mounting panels 16a' and cable glands 18' rather than eight). FIG. 2 illustrates the shelf 10' with no cables. FIG. 3 illustrates the shelf 10' with a single cable 20 entering the shelf 10' through a cable gland 18. As shown in FIG. 3, the mounting panels 16a' and the center panel 16c' rearwardly extend as far as a reference line RL. FIG. 4 illustrates a portion of the shelf 10 with a plurality of cables 20 entering the shelf 10. FIGS. 3 and 4 show that the cables 20 extend laterally and rearwardly from their respective cable glands 18 past the side walls 14 of the shelves 10, 10', such that less space rearward of the shelves 10, 10' is required for the cables 20 than if they extended directly rearwardly from the glands 18. Thus, space can be saved behind the shelves, 10, 10'.

Figure 5:
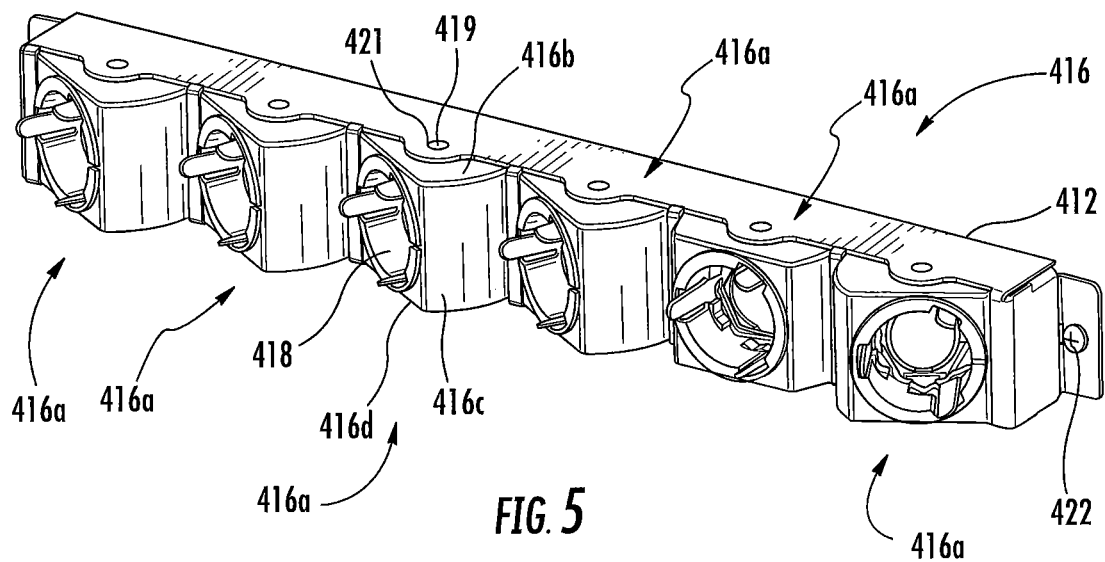
FIG. 5 is a partial rear perspective view of a rear wall assembly of a communications enclosure shelf according to alternative embodiments of the invention.

Another embodiment of a rear wall assembly for a shelf, designated at 416, is illustrated in FIG. 5. The rear wall assembly 416 includes a series of mounting boxes 416a that are pivotally mounted within a frame 412. Each mounting box 416a includes a ceiling 416b, a floor 416c, side walls 416c, and a mounting panel 416d. A cable gland 418 is mounted in the mounting panel 416b of each mounting box 416a. Each of the mounting boxes 416a is mounted via pins 419 within holes 421 in the frame 412, and is therefore able to pivot about a vertical axis defined by the pins 419 (typically the mounting boxes 416a can pivot from about 30 to 120 degrees). The rear wall assembly 416 can be attached to the rear of a shelf via screws 422 or other fastening means.

As can be seen in FIG. 5, each of the mounting boxes 416a may be pivoted to a desired orientation to receive a cable in its gland 418. In FIG. 5, four of the mounting boxes 416a are pivoted to receive a cable entering from the left side of the page, one of the mounting boxes 416a is pivoted to receive a cable entering from the right side of the page, and one mounting box 416a is pivoted to receive a cable directly from the rear of the rear wall assembly 416. Thus, it can be seen that the rear wall assembly 416 enables a shelf to which it is attached to receive cables from the right, the left, or directly behind the rear wall assembly 416 as desired by the operator.

Figure 6:
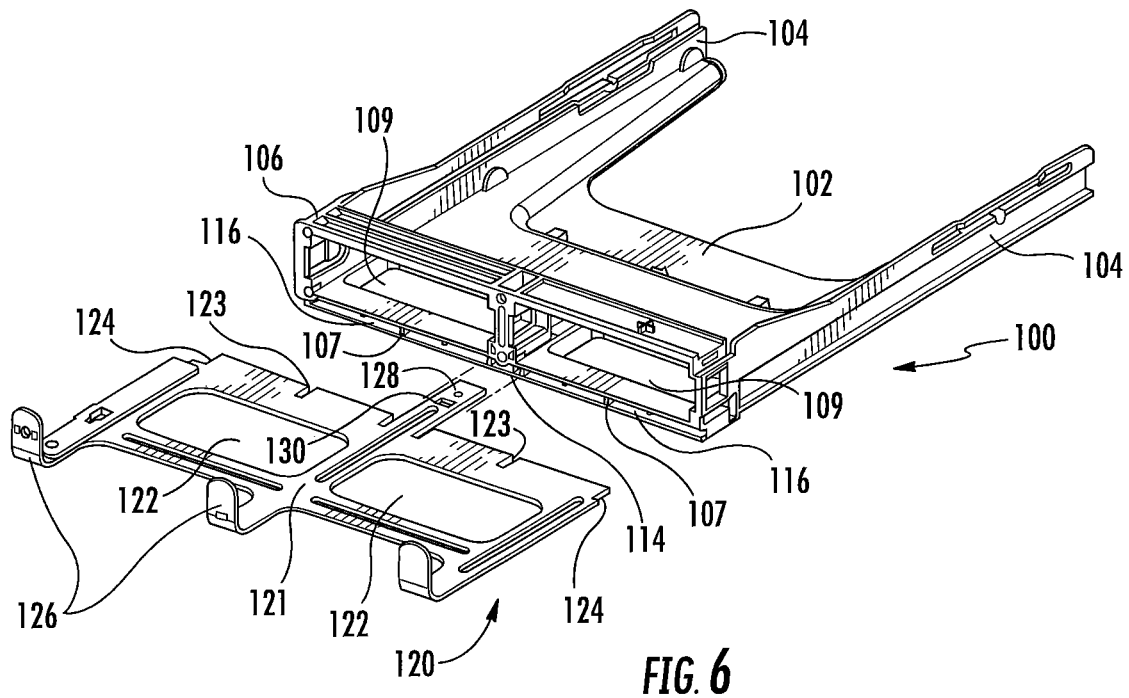
FIG. 6 is an exploded front perspective view of a fiber optic tray assembly according to embodiments of the invention.
Figure 7:
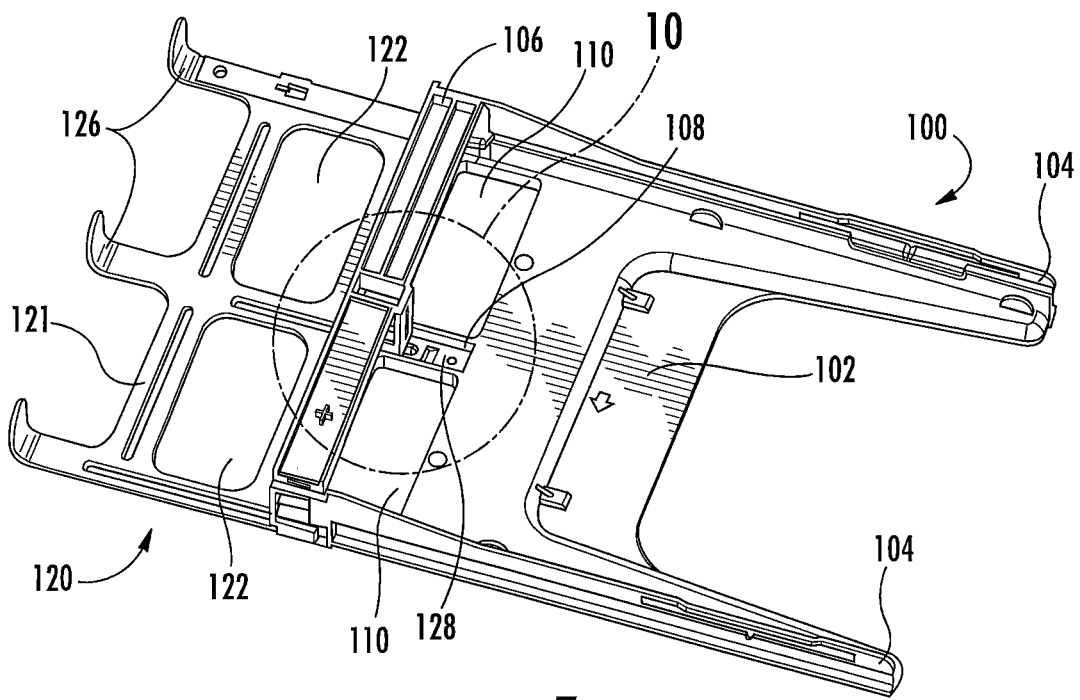
FIG. 7 is a rear perspective view of the assembly of FIG. 6.

Another approach that can provide flexibility in patch cord management is embodied in a fiber tray 100, illustrated in FIGS. 6-9. As can be seen in FIGS. 6 and 7, the fiber tray 100 has a generally U-shaped floor 102. Rails 104 are mounted to opposite edges of the floor 102 and extend upwardly and rearwardly therefrom. The rails 104 are configured to mate with and slide relative to rails of a rack, cabinet or enclosure. A bulkhead 106 configured with openings 109 to receive fiber optic adapters in which to connect cables is mounted to the forward ends of the rails 104 and the floor 102. A channel 108 extends between the bulkhead and the forward portion of the floor 102, thereby creating access openings 110 on either side of the channel 108. A deflectable latch 112 (see FIG. 9) is located within the channel 108. A central window 114 in the bulkhead 106 provides access to the channel 108. Elongate lateral windows 116 flank the central window 114. Vertical ribs 107 divide each of the lateral windows 116.

Referring still to FIGS. 6-9, a cable management trough 120 is illustrated therein. The trough 120 is generally planar and includes access openings 122 within a frame 121. Cutouts 124 are present on either side of the frame 121, as are slots 123 on the rear edge of the frame 121. Three upwardly-extending fingers 126 are positioned on the front of the trough 120 at spaced locations forward of the frame 121. A tongue 128 extends rearwardly from the frame 121 and includes a latch opening 130.

Figure 8:
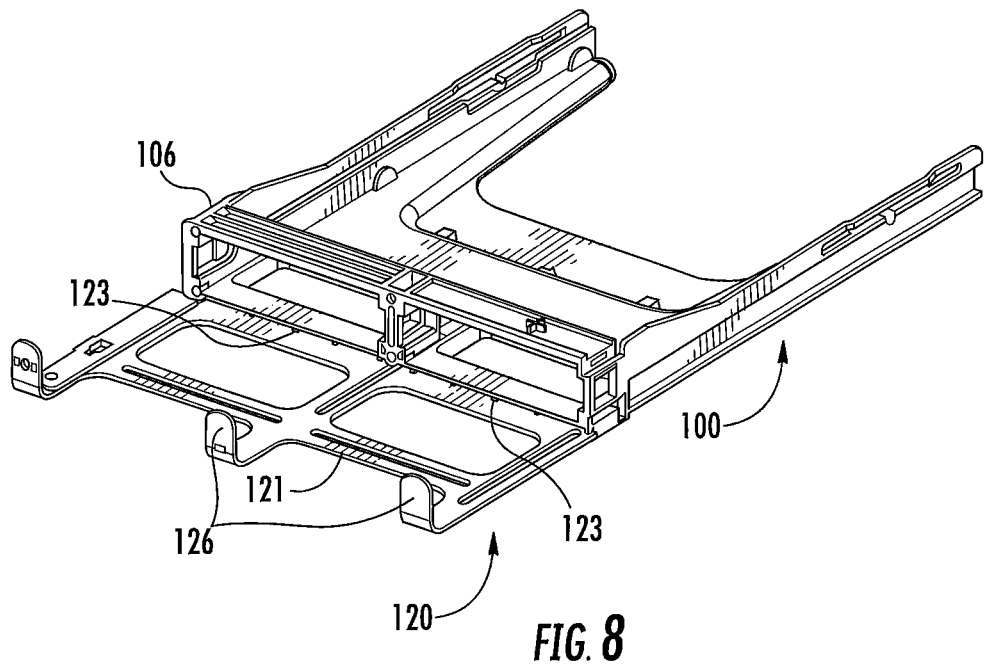
FIG. 8 is an assembled front perspective view of the fiber optic tray assembly of FIG. 6.
Figure 9:
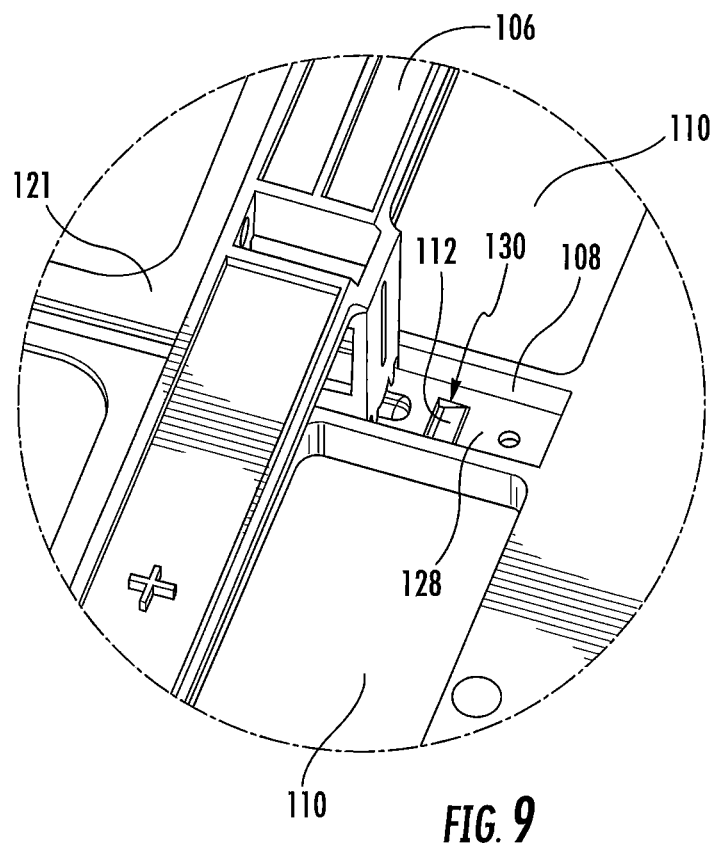
FIG. 9 is an enlarged partial rear perspective view of the assembly of FIG. 6.

As can be seen in FIG. 8, the trough 120 can be mounted to the tray 100 by sliding the tongue 128 through the window 114 into the channel 108. The tongue 128 slides over the latch 112, thereby deflecting the latch 112 downwardly; once the latch opening 130 slides into position over the latch 112, the latch 112 recovers and protrudes into the latch opening 130 to secure the tongue 128 in place (see FIG. 9). In some embodiments, the latch 112 is configured such that it makes an audible "click" when in place in the latch opening 130. The trough 120 is further stabilized by the rear edge of the frame 121 entering the lateral windows 116; the cutouts 124 of the trough 120 interact with the outer walls of the bulkhead 106, and the slots 123 are received by ribs 107 in the bulkhead 106 (see FIG. 8). Once in place, the trough 120 can provide structure for the management of cables connected to the front of the tray 100.

Figure 10:
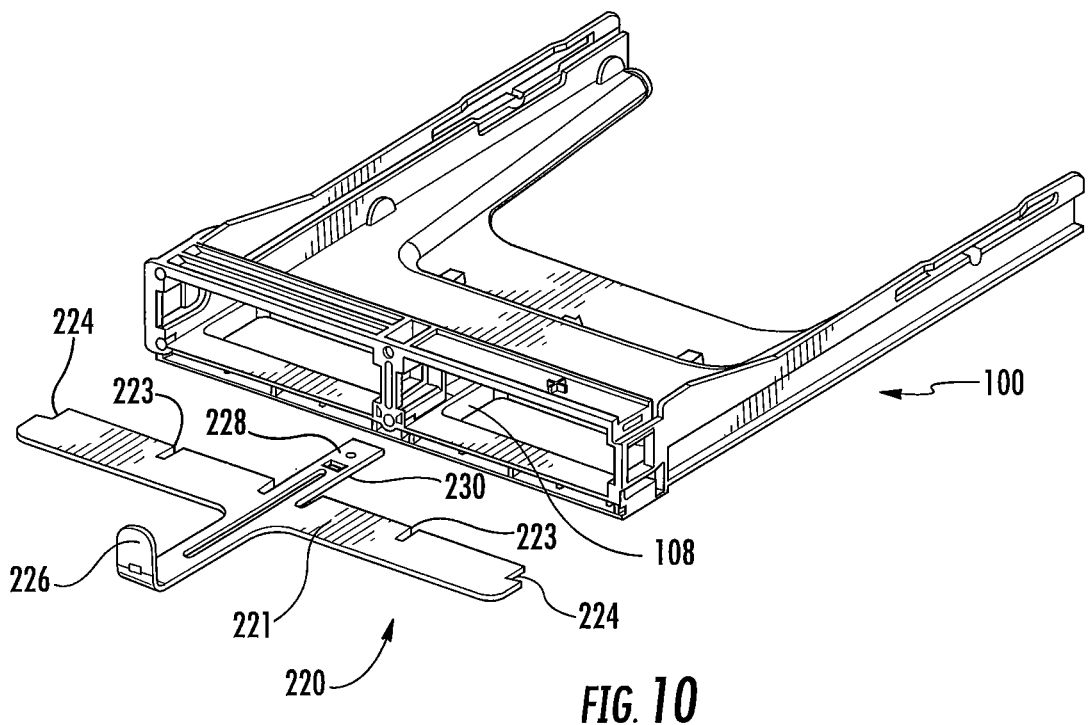
FIG. 10 is an exploded front perspective view of a fiber optic tray assembly according to additional embodiments of the invention.
Figure 11:
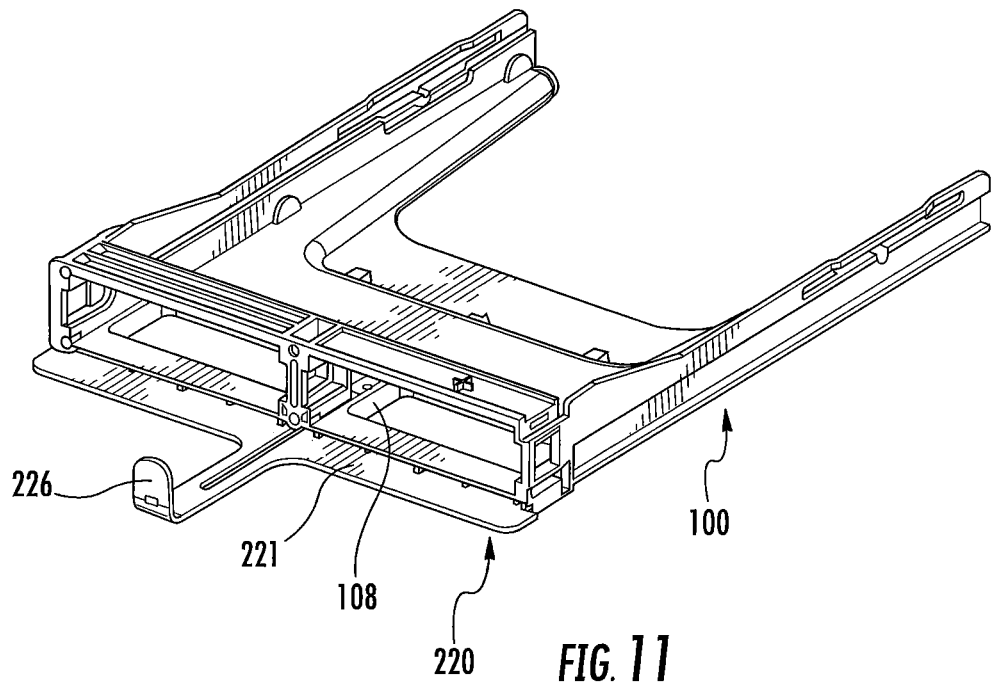
FIG. 11 is an assembled front perspective view of the fiber optic tray assembly of FIG. 10.

Referring now to FIGS. 10 and 11, a "J-hook" for cable management, designated broadly at 220, is shown therein. The J-hook 220 includes a frame 221 with slots 223 and cutouts 224 positioned similarly to the same features in the trough 120. A finger 226 extends forwardly of the frame 221, and a tongue 228 with a latch opening 230 extends rearwardly of the frame 221.

As can be seen in FIGS. 10 and 11, the J-hook 220 can be mounted to the tray 100 in much the same manner as the trough 120. The tongue 228 of the J-hook 220 is inserted into the channel 108 and slid rearwardly until the latch 112 protrudes through the latch opening 230. The slots 223 and cutouts 224 help to stabilize the mounted J-hook 220. Once in place, the J-hook 220 can provide a smaller structure for the management of cables connected to the front of the tray 100.

It will be understood by those of skill in this art that a user can select either the trough 120 or the J-hook 220 as a preferred cable management structure and can easily install either device on the tray 100. It should also be apparent that, should the user decide to convert from one cable management structure to the other, either can be easily swapped for the other by simply depressing the latch 112 sufficiently to detach the latch 112 from the tongue 128, 228 and sliding the structure 120, 220 from the channel 108.

Figure 12:
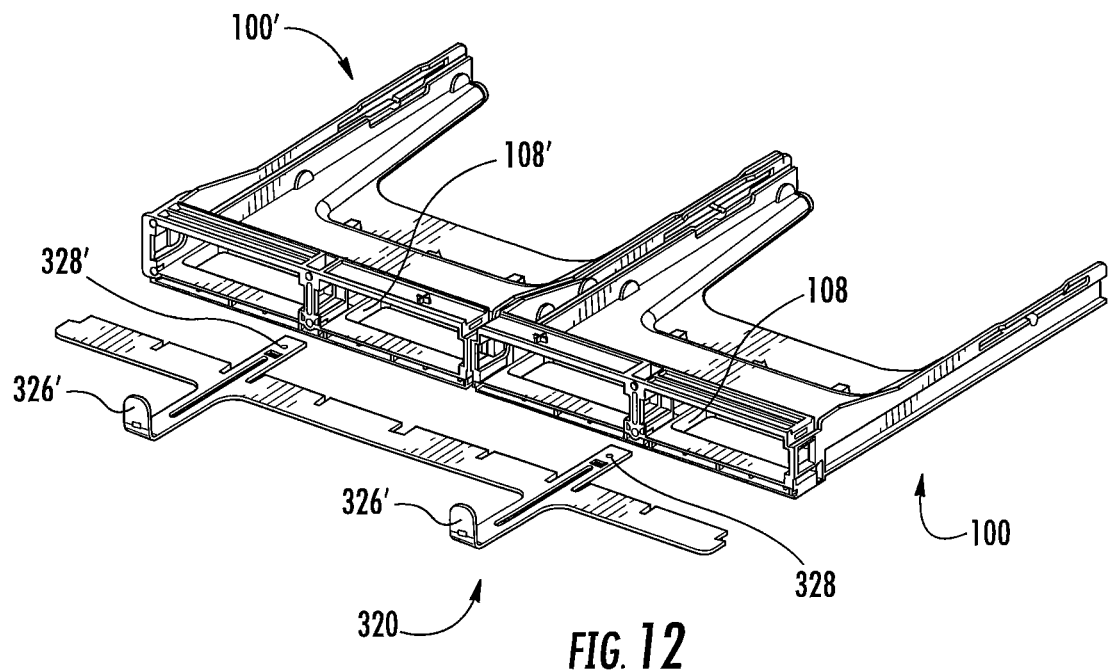
FIG. 12 is an exploded front perspective view of a dual fiber optic tray assembly according to additional embodiments of the invention.
Figure 13:
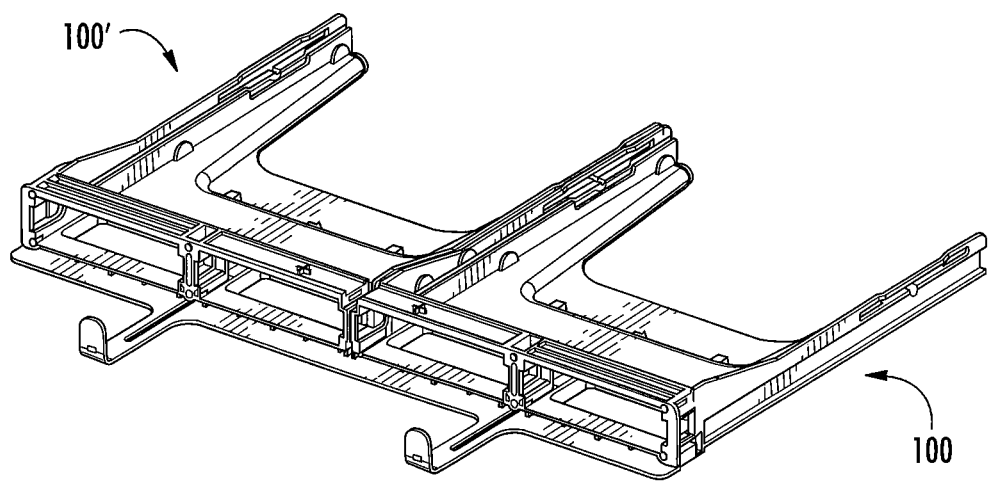
FIG. 13 is an assembled front perspective view of the dual fiber optic tray assembly of FIG. 12.

Another configuration for cable management is illustrated in FIGS. 12 and 13. Two trays 100, 100' are shown in side-by-side relationship. A dual J-hook 320 has a construction that is similar to the combination of two J-hooks 220 combined as a single unit, with two tongues 328, 328' and two fingers 326, 326'. The dual J-hook 320 can be installed onto the trays 100, 100' by inserting the tongues 328, 328' into the channels 108, 108' until they are secured with the latches of the trays 100, 100'.

Those of skill in this art will appreciate that the fiber optic tray and cable management devices may be configured differently. For example, the latch and slot configuration of the tongue and channel may be reversed, such that the latch is included on the tongue and the slot in the channel. The channel may lack side walls. The floors of either or both of the fiber optic tray and trough may lack access openings. The rails of the fiber optic tray may be configured differently. The fingers of the trough and J-hook may be shaped in a different manner and/or may extend laterally for much or all of the full expanse of the frame. Other configurations will be apparent to the ordinarily skilled artisan.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A fiber optic shelf, comprising:
a floor;
two side walls attached to opposite side edges of the floor, the shelf defining an axis extending between and perpendicular to the side walls;
a plurality of first cable glands mounted to each of the side walls and facing parallel to the axis of the shelf, each of the first cable glands being an assembly comprising multiple parts and being adapted to provide a seal around a cable entering the shelf parallel to the axis of the shelf through the respective first cable gland, one of the multiple parts being a nut;

the shelf further comprising a rear wall attached to a rear edge of the floor;
wherein the rear wall has a stepped profile and comprises a plurality of mounting panels facing laterally at an oblique angle to the axis of the shelf, a second cable gland being mounted in each of the mounting panels, each of the second cable glands being adapted to provide a seal around a cable entering the shelf through the second cable gland;
wherein the rear edge of the floor has a stepped profile coterminous with edges of the mounting panels; and
wherein the plurality of mounting panels comprises first and second subsets of mounting panels, with the first subset of mounting panels facing laterally toward one side of the shelf, and the second subset of mounting panels facing laterally toward a second side of the shelf, wherein the rear wall includes a center panel facing generally perpendicular to the axis, the center panel being positioned between the first and second subsets of mounting panels, the mounting panels and the center panel extending rearwardly to the same extent.

2. The fiber optic shelf defined in claim 1, wherein the rear wall further comprises a plurality of transition panels located between adjacent mounting panels, and wherein the stepped profile of the rear edge of the floor is coterminous with edges of the transition panels.

3. The fiber optic shelf defined in claim 2, wherein each of the transition panels faces inwardly at an oblique angle to the axis of the shelf.

4. The fiber optic shelf defined in claim 1, further comprising a fiber optic cable routed through at least one of the cable glands.

5. The fiber optic shelf defined in claim 1, wherein the oblique angle is between about 30 and 60 degrees.

6. The fiber optic shelf of claim 1,
wherein the floor extends longitudinally continuously from one of the two side walls to the other of the two side walls; and
wherein the first and the second subsets of mounting panels are disposed between the two side walls.

7. The fiber optic shelf of claim 1, wherein a total number of the first cable glands equals a total number of the second cable glands.

8. The fiber optic shelf of claim 1, wherein at least three of the first cable glands are mounted to each of the side walls.

9. The fiber optic shelf of claim 1, wherein a total number of the mounting panels in one of the first and second subsets equals a total number of the first cable glands mounted to one of the sides, and a total number of the mounting panels in the other of the first and second subsets equals a total number of the first cable glands mounted to the other of the sides.

10. A communications rack comprising:
a fiber optic shelf adapted to route one or more fiber optic cables to the communications rack, the fiber optic shelf comprising:
a floor;
two side walls attached to opposite side edges of the floor, the shelf defining an axis extending between and perpendicular to the two side walls;
a rear wall attached to a rear edge of the floor, the rear wall having a stepped profile and comprising a plurality of mounting panels facing at an oblique angle to the axis of the shelf;
a first cable gland mounted in each of the mounting panels; and
a plurality of second cable glands mounted in each of the side walls, the second cable glands facing parallel to the axis of the shelf;
wherein each of the second cable glands is an assembly comprising multiple parts and being adapted to provide a seal around a cable entering the fiber optic shelf parallel to the axis of the shelf through the respective second cable gland, one of the multiple parts being a nut;
wherein each of the first cable glands is adapted to provide a seal around a cable entering the shelf through the first cable gland;
wherein the rear edge of the floor has a stepped profile coterminous with edges of the mounting panels; and
wherein the plurality of mounting panels comprises first and second subsets of mounting panels, with the first subset of mounting panels facing toward one side of the shelf, and the second subset of mounting panels facing toward a second side of the shelf, wherein the rear wall includes a center panel facing generally perpendicular to the axis, the center panel being positioned between the first and second subsets of mounting panels, the mounting panels and the center panel extending rearwardly to the same extent.

11. The communications rack of claim 10, wherein the rear wall further comprises a plurality of transition panels located between adjacent mounting panels, and wherein the stepped profile of the rear edge of the floor is coterminous with edges of the transition panels.

12. The communications rack of claim 11,
wherein the floor extends continuously from one of the two side walls to the other of the two side walls; and
wherein the first and the second subsets of mounting panels are disposed between the two sidewalls.

13. A communications rack extending from a front to a rear along a first axis and comprising:
a fiber optic shelf, including:
a floor and first and second side walls attached to opposite edges of the floor, the shelf defining a second axis extending between and perpendicular to the first and second side walls and perpendicular to the first axis, the first side wall having a plurality of first cable glands positioned in the first side wall and facing parallel to the second axis, each of the first cable glands being adapted to provide a seal around a cable entering the shelf parallel to the second axis of the shelf, each of the first cable glands being an assembly comprising multiple parts and being adapted to provide a seal around a cable entering the shelf through the first cable gland, one of the multiple parts being a nut;
a first projecting wall extending perpendicularly from a front edge of the first side wall;
a third side wall extending frontwards from an edge of the first projecting wall and parallel to the first side wall;
a first rear wall extending perpendicularly from a rear edge of the first side wall;
a second projecting wall extending perpendicularly from the first rear wall and parallel to the first side wall; and
a second rear wall extending from a rear edge of the second projecting wall, the second rear wall having a stepped profile and comprising a plurality of mounting panels facing at oblique angles to the second axis, a second cable gland being mounted in each of the mounting panels, each of the second cable glands being adapted to provide a seal around a cable, the plurality of mounting panels comprising first and second subsets of the mounting panels, with the first subset facing laterally towards the first side wall and the second subset facing laterally away from the first side wall, the second rear wall further including a center panel facing generally parallel to the first axis, the center panel being positioned between the first and second subsets of the mounting panels, and the mounting panels and the center panel extend rearwardly to the same extent.

14. The communications rack of claim 13, wherein the rear wall further comprises a plurality of transition panels located between adjacent mounting panels.

15. The communications rack of claim 14, wherein the transition panels face at oblique angles to the second axis.

* * * * *